US009168814B2

(12) United States Patent
Gandhi

(10) Patent No.: US 9,168,814 B2
(45) Date of Patent: Oct. 27, 2015

(54) TUNABLE SOUND DAMPENING SYSTEM

(71) Applicant: Toyota Motor Engineering & Manufacturing North America, Inc., Erlanger, KY (US)

(72) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 25 days.

(21) Appl. No.: 14/184,708

(22) Filed: Feb. 20, 2014

(65) Prior Publication Data
US 2015/0231951 A1 Aug. 20, 2015

(51) Int. Cl.
*B60R 13/08* (2006.01)
*B60J 5/04* (2006.01)
*B29C 70/30* (2006.01)

(52) U.S. Cl.
CPC .............. *B60J 5/0418* (2013.01); *B29C 70/30* (2013.01); *B60R 13/08* (2013.01)

(58) Field of Classification Search
CPC .............. B60J 1/16; B60J 1/17; B60J 5/0418; B60R 13/08–13/0884; B61D 17/185; B62D 33/0604; F02B 77/11; G10K 11/178; H01L 41/0825; H01L 41/09–41/0993
See application file for complete search history.

(56) References Cited

U.S. PATENT DOCUMENTS

| | | | |
|---|---|---|---|
| 5,640,063 A * | 6/1997 | Zumeris et al. | 310/328 |
| 7,705,522 B2 * | 4/2010 | Gandhi | 310/328 |
| 8,144,889 B2 | 3/2012 | Cheng et al. | |
| 8,144,899 B2 * | 3/2012 | Song et al. | 381/184 |
| 2005/0147260 A1 * | 7/2005 | Gustavsson | 381/86 |
| 2008/0001431 A1 * | 1/2008 | Thompson et al. | 296/187.01 |
| 2010/0263963 A1 * | 10/2010 | Honji | 181/175 |
| 2010/0290639 A1 * | 11/2010 | Snider et al. | 381/86 |
| 2012/0134838 A1 * | 5/2012 | Ramirez Jimenez et al. | 416/229 R |
| 2013/0170013 A1 * | 7/2013 | Tonar et al. | 359/296 |

FOREIGN PATENT DOCUMENTS

WO 2013/134340 A1 9/2013

* cited by examiner

*Primary Examiner* — Glenn Dayoan
*Assistant Examiner* — Paul Chenevert
(74) *Attorney, Agent, or Firm* — Christopher G. Darrow; Darrow Mustafa PC

(57) ABSTRACT

A sound dampening system having at least two acoustic deflection pads separated by a distance and an actuator operable to alter the distance in response to a stimulus. In some embodiments, the actuator is a shape memory alloy wire. The system is capable of alternating between a compact mode and a superior sound blocking mode. A door of an automotive vehicle incorporating such a system and a method of fabricating such a system.

20 Claims, 3 Drawing Sheets

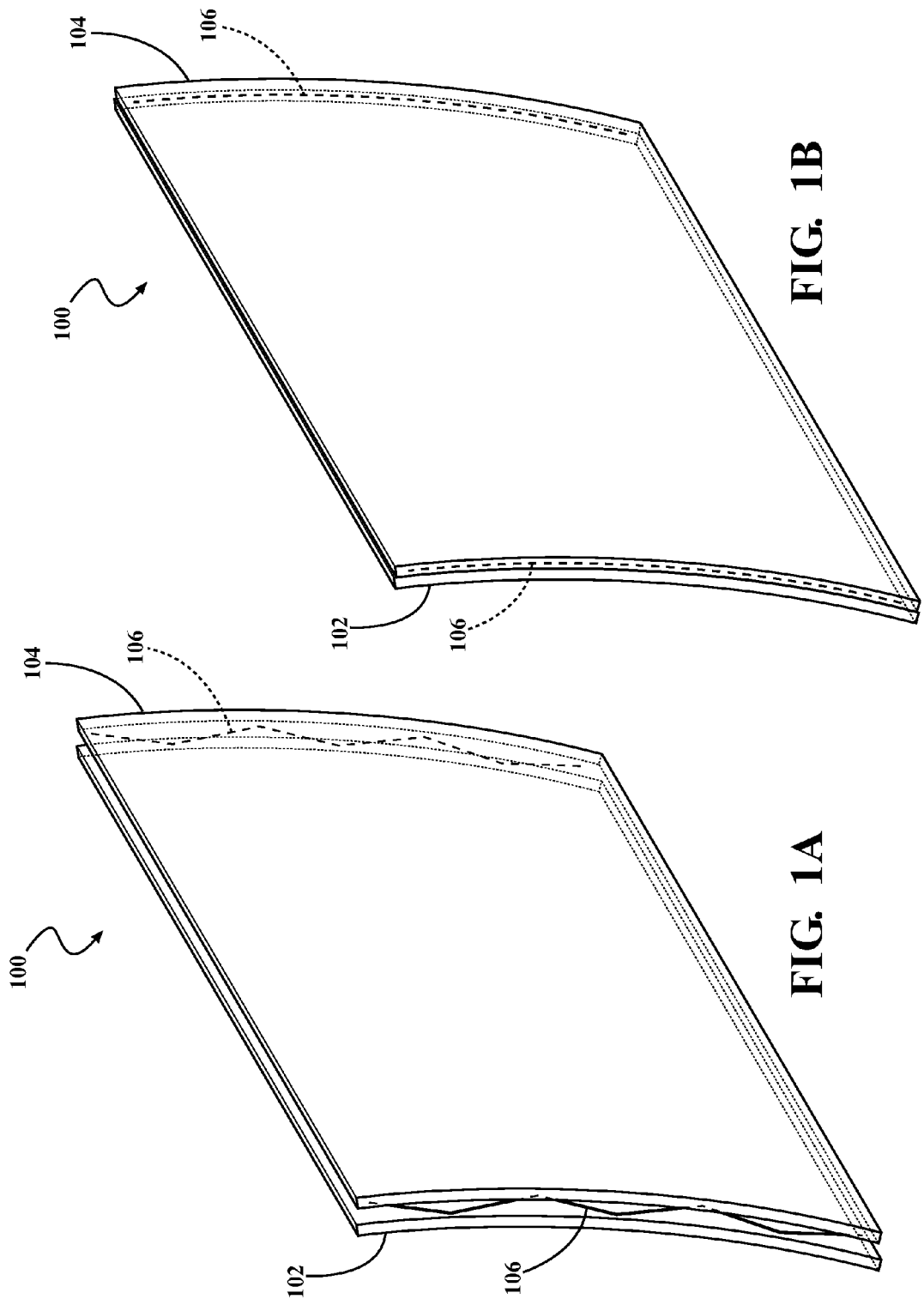

FIG. 2A
FIG. 2B
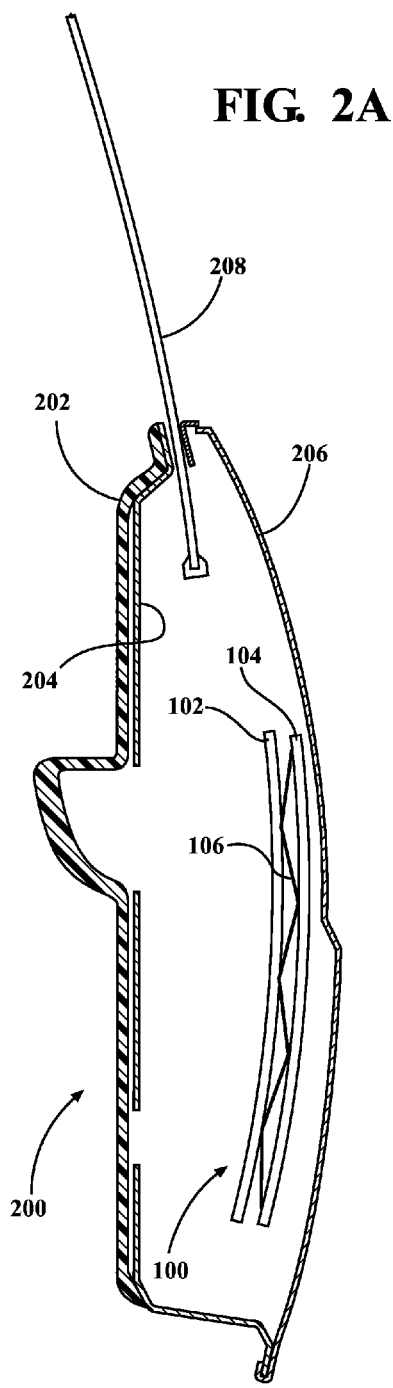
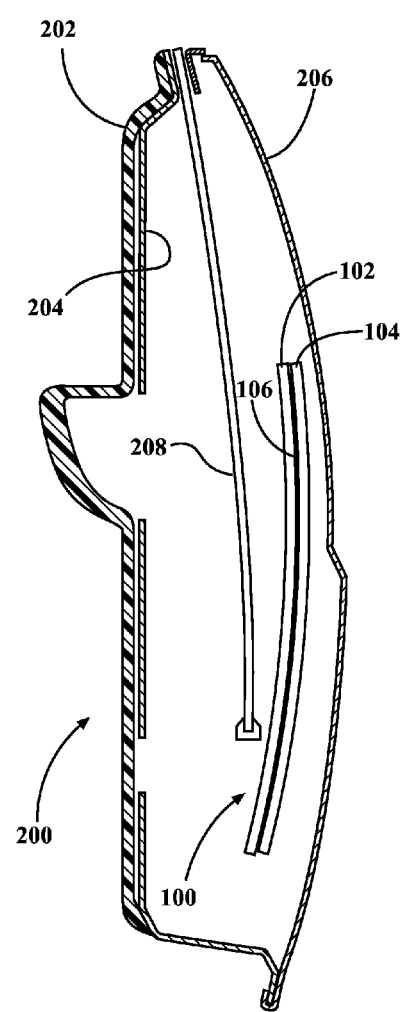

TUNABLE SOUND DAMPENING SYSTEM

BACKGROUND

Sound dampening pads are used in the doors of cars and other automotive vehicles to absorb, deflect, or otherwise mitigate transmission of sound from outside of the vehicle to the cabin. Such pads can be deployed between door panels, within the interior of the door itself, where space constraints limit the size and shape of the pad. Limits to the size and shape of sound dampening pads can correlate to limitations of the pads' ability to decrease sound transmission to the vehicle cabin.

The amount of space theoretically available to house a sound dampening pad in some contexts may not be consistent over time. For example, within the context of an automotive vehicle door having a reversibly openable window, the amount of space available to house a sound dampening system can be greater when the window is up as opposed to when the window is down. A sound dampening system which has a fixed, non-varying shape and size is incapable of utilizing this extra space.

Beyond the composition and structure of individual sound dampening pads, the use of two sound dampening pads arranged in parallel, i.e. a double-wall system, can have significant effects on sound dampening capability. In some circumstances, a double wall system having a larger distance of separation between the two walls or pads will have significantly greater sound dampening capability as compared to a double wall system with a smaller or no distance of separation between the two walls or pads. Additionally, differences in the separation space between two pads or walls of a double wall system can alter the frequency response of the system.

SUMMARY

Systems for dampening or deflecting sound include two sound deflecting pads that are spaced apart and an actuator such as a shape memory alloy wire which can increase or decrease a separation space between the pads. The activity of the actuator enables such systems to alternate between a bulkier mode which typically has superior sound deflecting capability and a more compact mode to accommodate varying space requirements. Automotive vehicle doors incorporating such systems have the ability to spatially accommodate a door window when it is in a downward position and yet have altered or increased sound deflecting capability when the window is in an upward position. Methods of fabricating such systems are additionally disclosed.

One implementation of the described embodiments discloses a sound dampening system. The system comprises a first acoustic deflection pad operable to obstruct propagating sound waves, a second acoustic deflection pad operable to obstruct propagating sound waves and separated from the first pad by a distance, and an actuator such as a shape memory alloy wire, engaged with the first and second acoustic deflection pads and operable to change the distance of separation in response to a stimulus.

Another implementation of the described embodiments discloses a door of an automotive vehicle having a sound dampening system. The system of the door comprises a first acoustic deflection pad operable to obstruct propagating sound waves, a second acoustic deflection pad operable to obstruct propagating sound waves and separated from the first pad by a distance, and an actuator such as a shape memory alloy wire, engaged with the first and second acoustic deflection pads and operable to change the distance of separation in response to a stimulus.

Another implementation of the described embodiments discloses a method of fabricating a sound dampening system. The method comprises deploying a first acoustic deflection pad which is substantially planar and deploying a second acoustic deflection pad which is also substantially planar and is deployed substantially in parallel to the first acoustic deflection pad. The method further comprises affixing a shape memory alloy wire to each of the first and second acoustic deflection pads such that the shape memory alloy wire is operable to change a distance of separation between the first and second acoustic deflection pads in response to a stimulus.

BRIEF DESCRIPTION OF THE DRAWINGS

Various aspects and advantages of the invention will become apparent and more readily appreciated from the following description of the various aspects taken in conjunction with the accompanying drawings, of which:

FIG. 1A is a perspective view of a sound dampening system, with acoustic deflection pads separated by a first distance;

FIG. 1B is a perspective view of the system of FIG. 1A, with acoustic deflection pads separated by a second distance;

FIG. 2A is a side sectional view of a door of an automotive vehicle having the sound dampening system of FIG. 1A;

FIG. 2B is a side sectional view of a door of an automotive vehicle having the sound dampening system of FIG. 1B.

DETAILED DESCRIPTION

Figure 3:
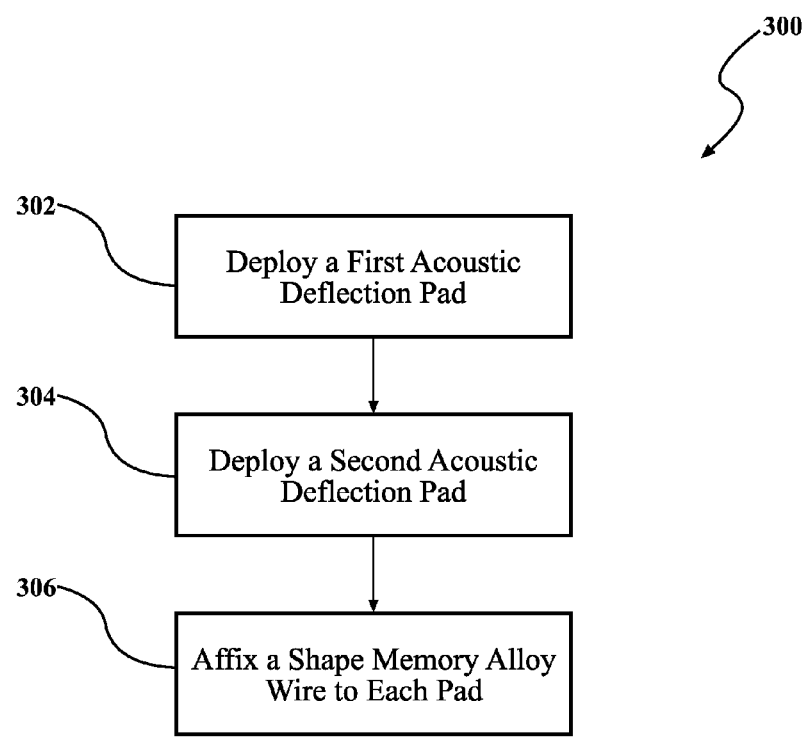
FIG. 3 is a schematic depiction of a method for fabricating the sound dampening system of FIG. 1A.

The present disclosure relates to a sound dampening system with a size and/or shape which are changeable in response to a stimulus. The disclosure also relates to a door of an automotive vehicle having a sound dampening system with a size which is changeable in response to the position of a door window. The disclosure also relates to a method of fabricating a sound dampening system.

Referring now to FIG. 1A, a sound dampening system 100, referred to at times below as the system 100, includes a first acoustic deflection pad 102 and a second acoustic deflection pad 104. Each of the first acoustic deflection pad 102 and the second acoustic deflection pad 104 is operable to mitigate transmission of an acoustic wave incident upon the panel. In general, the phrase "acoustic deflection" as used herein refers to the characteristic of reflecting, absorbing, obstructing or otherwise decreasing continued propagation of a sound wave incident upon a pad through or beyond the pad. In instances below where the first acoustic deflection pad 102 and the second acoustic deflection pad 104 are referred to as a pair, the pair will at times be referred to as the first and second acoustic deflection pads 102, 104 or, at times simply "the pads."

The first acoustic deflection pad 102 and the second acoustic deflection pad 104 can, in general, be of any shape or size. In some manifestations, the first acoustic deflection pad 102 and the second acoustic deflection pad 104 will be of a shape and size suitable for housing within the interior of an automotive vehicle door. In some instances, the first acoustic deflection pad 102 and the second acoustic deflection pad 104 will be substantially planar, having opposing first and second extensive surfaces bounded by at least one edge surface. In many instances, the first acoustic deflection pad 102 and/or the second acoustic deflection pad 104 will possess a shape which deviates from strict geometric planarity. Such deviations can include curvilinear regions or angled regions which can serve to improve the fit of the first acoustic deflection pad 102 and/or the second acoustic deflection pad 104 within which the system 100 is housed. It should be noted that, while the first acoustic deflection pad 102 and the second acoustic deflection pad 104 can in many instances possess a shape and size that are highly similar or identical relative to one another, they need not necessarily be so.

The first acoustic deflection pad 102 and the second acoustic deflection pad 104 can be composed of any suitable material or combination of materials. In many instances, such a suitable material will comprise a polymeric material which may be an inorganic polymeric material such as fiberglass. In other instances, such material will comprise an organic polymeric material including, but not limited to, nylon, polyurethane, or polystyrene. In some variations, such organic polymeric material can comprise a felt or other non-woven or woven fabric. In other variations, organic polymeric material can comprise a foamed, solid organic polymer, such as polyurethane foam. In yet other variations, organic polymeric material can comprise an extruded or expanded material, such as extruded or expanded polystyrene.

The system 100 additionally includes an actuator 106 that is operable, when activated, to change a distance of separation between the first acoustic deflection pad 102 and the second acoustic deflection pad 104. The first and second acoustic deflection pads 102, 104 are present in the system 100 with a first distance of separation between them when the actuator 106 is not activated. Activation of the actuator 106, by moving either or both of the first and second acoustic deflection pads 102, 104 causes the first and second acoustic deflection pads 102, 104 to be present at a second distance of separation relative to one another, where the second distance of separation differs from the first distance of separation. In many instances, the second distance of separation, resulting from activation of the actuator 106, will be less than the first distance of separation existing when the actuator 106 is not activated.

The phrase "distance of separation," as used herein, can refer in some instances to a distance between a point on a surface of the first acoustic deflection pad 102 which faces the second acoustic deflection pad 104 and a nearest point on a surface of the second acoustic deflection pad 104 which faces the first acoustic deflection pad 102. In other instances, the phrase "distance of separation" can refer to an average distance of separation between facing surfaces of the first and second acoustic deflection pads 102, 104. In some variations, the decrease in the distance of separation between the first and second acoustic deflection pads 102, 104 upon activation of the actuator 106 can be similar or uniform across all corresponding points of the facing surfaces of the first and second acoustic deflection pads 102, 104.

In general, system 100 will have greater sound obstructing capability when the acoustic deflection pads 102, 104 have a greater distance of separation between them as opposed to a smaller distance of separation. Changes in the distance of separation effected by the actuator 106 can also, in some embodiments, be utilized to tune the system 100 to alter its effectiveness at deflecting particular sound frequencies.

In some embodiments, the actuator 106 can be an electromechanical actuator, such as a motor, responsive to an electrical stimulus. In some embodiments of the system 100, the actuator 106 can comprise a shape memory alloy (SMA). In particular, the actuator 106 can comprise a wire formed substantially of an SMA material.

An SMA wire can have a shape or structure in which it is present when at a lower temperature and an alternate shape or structure in which it is present when at a higher temperature. Some SMA wires can reversibly and repeatedly alternate between the two shapes or structures when the temperature is alternated to variously meet or fall below the lower temperature and meet or exceed the higher temperature. In particular, an SMA wire can be configured such that it experiences a sudden length decrease or size reduction when elevated to or above a first temperature and a length increase or size expansion when decreased to or below a second temperature.

An SMA wire can therefore be "activated" and "deactivated" by alternation between the first and second temperatures, or between temperatures which exceed and fall below the first and second temperatures, respectively. Such alternation can be achieved in some instances by deploying a temperature modulator in proximity to the SMA wire. In other instances, such temperature alternation can be achieved by applying and removing an electrical voltage across the SMA wire. Thus in some embodiments, an SMA wire will be configured such that, when no voltage is applied, it is present in a first shape or structure which causes the first and second acoustic deflection pads 102, 104 to be present at the first distance of separation relative to one another. The SMA wire will further be configured such that, when a sufficient voltage is applied, it is present in a second shape or structure which causes the first and second acoustic deflection pads 102, 104 to be present at the second distance of separation relative to one another.

Suitable SMAs can include, but are not limited to, nickel-titanium (Ni—Ti, or nitinol), Cu—Al—Ni, Fe—Mn—Si, and Cu—Zn—Al. In many applications, the actuator 106 will comprise a wire composed substantially of nitinol.

In embodiments in which the actuator 106 comprises a wire of nitinol or other SMA, the SMA wire will engage the first and second acoustic deflection pads 102, 104 via affixation or other means. Where present, the SMA wire can be affixed to the first and second acoustic deflection pads 102, 104 by weaving through apertures present in the first and second acoustic deflection pads 102, 104 or by the use of an adhesive. In instances where an SMA wire is woven through apertures present in the first and second acoustic deflection pads 102, 104, such apertures can be reinforced with reinforcing rings or other means in order to minimize damage over repeated activation cycles of the SMA wire.

Referring now to FIG. 2A, a door 200 of an automotive vehicle includes a sound dampening system 100 of the type described above and previously illustrated in FIGS. 1A and 1B. The system 100 is deployed within the interior of the door 200 and includes a first acoustic deflection pad 102 operable to obstruct propagating sound waves, a second acoustic deflection pad 104 operable to obstruct propagating sound waves and separated from the first acoustic deflection pad by a distance, and an actuator 106 operable to decrease the distance separating the first acoustic deflection pad 102 from the second acoustic deflection pad 104 in response to electrical stimulus.

The actuator 106 can be an SMA wire that is affixed to or otherwise engaged with each of the first and second acoustic deflection pads 102, 104. Suitable means by which an SMA wire can be affixed to the first and second acoustic deflection pads 102, 104 include weaving the wire through apertures present in the pads and the use of an adhesive. In instances where an SMA wire is woven through apertures present in the first and second acoustic deflection pads 102, 104, such apertures can be reinforced with reinforcing rings or otherwise in order to minimize damage over repeated activation cycles of the SMA wire.

The door 200 can include a variety of structural and other panels such as, for example, an inner trim panel 202, an inner structural panel 204, and an outer structural panel 206. In some variations, the first acoustic deflection pad 102 or the second acoustic deflection pad 104 can be secured, directly or indirectly, to a panel such as the inner structural panel 204 or the outer structural panel 206.

The door 200 will typically include a window 208 which a passenger can adjust upward or downward. In many implementations, the system 100 can be configured so that the actuator 106 is activated to decrease a distance between the first and second acoustic deflection pads 102, 104 when the window 208 is moved downward. In such a configuration, the system 100 can possess increased sound deflection capability when the window 208 is in an upward position, as illustrated in FIG. 2A. The system 100 can then adopt an altered shape that is able to accommodate the window 208 when the window 208 is in a downward position, as shown in FIG. 2B. In effect, when incorporated into the door 200, the system 100 can alternate between a superior sound dampening mode when the window 208 is up, and a compact, window accommodation mode when the window 208 is down.

In such implementations, any suitable trigger can be utilized to cause the system 100 to automatically convert to a window accommodation mode when the window 208 is moved downward as in FIG. 2B and to revert to a superior sound dampening mode when the window 208 is moved upward as in FIG. 2A. For example, a window position sensor can be placed within the door 200 to detect when the position of the window 208 has moved above or below a sensor point. When the window 208 position is detected to be below the sensor point this would serve as a signal that the actuator 106 should decrease a distance of separation between the first and second acoustic deflection pads 102, 104. Similarly, when the window 208 position is detected to be above the sensor point this would serve as a signal that the actuator 106 should increase a distance of separation between the acoustic deflection pads 102, 104.

In an alternative example, activation of actuator 106 could be directly linked to the passenger input for movement of the window 208. For example, pressing a "window down" button on a side door console, or holding such a button for a time interval, could directly trigger activation of the actuator 106 to decrease a distance of separation between the acoustic deflection pads 102, 104. Similarly, pressing or holding a "window up" button could directly trigger de-activation of the actuator 106 to increase a distance of separation between the acoustic deflection pads 102, 104.

SMA wires which can serve as suitable examples of the actuator 106 include, but are not limited to, nickel-titanium (Ni—Ti, or nitinol), Cu—Al—Ni, Fe—Mn—Si, and Cu—Zn—Al. In many applications, the actuator 106 will comprise a wire composed substantially of nitinol.

As illustrated schematically in FIG. 3, a method 300 of fabricating a sound dampening system 100 includes a step 302 of deploying a first acoustic deflection pad 102. Step 304 is deployment of a second acoustic deflection pad 104 at a distance from the first acoustic deflection pad 102.

The first acoustic deflection pad 102 and the second acoustic deflection pad 104 can be composed of any suitable material or combination of materials. In many instances, such material will comprise an organic polymeric material. In some variations, the first acoustic deflection pad 102 or the second acoustic deflection pad 104 can comprise a felt or other non-woven or woven fabric. Such fabric can be composed substantially of natural or synthetic organic polymer fibers such as wool or nylon, respectively. In other instances, the first acoustic deflection pad 102 or the second acoustic deflection pad 104 can comprise a foamed, solid organic polymer, such as polyurethane foam.

In step 306, an actuator 106 operable to reversibly change a distance separating the first and second acoustic deflection pads 102, 104, is affixed to each of the first acoustic deflection pad 102 and the second acoustic deflection pad 104.

In some variations, the actuator 106 of step 306 is a shape memory alloy wire which can be affixed to each of the first and second acoustic deflection pads 102, 104. Such a shape memory alloy wire can be composed substantially of nitinol, or any other alloy known to those skilled in the art to possess shape memory. Additional examples of SMA wires suitable for method 300 include Cu—Al—Ni, Fe—Mn—Si, and Cu—Zn—Al.

Suitable means of affixing an SMA wire to each of the first and second acoustic deflection pads 102, 104 include, but are not limited to, weaving the SMA wires through apertures present in the first and second acoustic deflection pads 102, 104 or by the use of an adhesive. In instances where an SMA wire is woven through apertures present in the first and second acoustic deflection pads 102, 104, such apertures can be reinforced with reinforcing rings or otherwise in order to minimize damage over repeated activation cycles of the SMA wire.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sound dampening system comprising:
   a first acoustic deflection pad operable to obstruct propagating sound waves;
   a second acoustic deflection pad operable to obstruct propagating sound waves and separated from the first acoustic deflection pad by a distance; and
   an actuator operable to decrease the distance separating the first acoustic deflection pad from the second acoustic deflection pad in response to electrical stimulus.

2. The system as recited in claim 1, wherein the first acoustic deflection pad is substantially parallel to the second acoustic deflection pad.

3. The system as recited in claim 1, wherein at least one of the first acoustic deflection pad and the second acoustic deflection pad comprises an organic polymeric material.

4. The system as recited in claim 3, wherein the organic polymeric material comprises nylon, polyurethane, polystyrene, or any combination thereof.

5. The system as recited in claim 1, wherein the actuator comprises a shape memory alloy wire.

6. The system as recited in claim 5, wherein the shape memory alloy wire is composed substantially of nitinol.

7. The system as recited in claim 5, wherein the shape memory alloy wire is affixed to the first acoustic deflection pad and the second acoustic deflection pad with an adhesive.

8. The system as recited in claim 5, wherein the shape memory alloy wire is woven through apertures present in the first acoustic deflection pad and the second acoustic deflection pad.

9. A door of an automotive vehicle having a sound dampening system comprising:
- a first acoustic deflection pad operable to obstruct propagating sound waves;
- a second acoustic deflection pad operable to obstruct propagating sound waves and separated from the first acoustic deflection pad by a distance; and
- an actuator operable to decrease the distance separating the first acoustic deflection pad from the second acoustic deflection pad in response to electrical stimulus.

10. The door as recited in claim 9, wherein the first acoustic deflection pad is substantially parallel to the second acoustic deflection pad.

11. The door as recited in claim 9, wherein the actuator comprises a shape memory alloy.

12. The door as recited in claim 11, wherein the shape memory alloy comprises a wire.

13. The door as recited in claim 12, wherein the wire is woven through apertures in at least one of the first acoustic deflection pad and the second acoustic deflection pad.

14. The door as recited in claim 9, further comprising:
- a window operable to be raised or lowered in response to a user input, wherein the actuator automatically decreases the distance between the first acoustic deflection pad and the second acoustic deflection pad in response to the user input.

15. The door as recited in claim 9, wherein the electrical stimulus is a voltage supplied by a battery of the automotive vehicle.

16. A method of fabricating a sound dampening system comprising:
- deploying a first acoustic deflection pad which is substantially planar;
- deploying a second acoustic deflection pad which is substantially planar, wherein the second acoustic deflection pad is deployed substantially in parallel to the first acoustic deflection pad; and
- affixing a shape memory alloy wire to each of the first acoustic deflection pad and the second acoustic deflection pad;
- wherein the shape memory alloy wire is operable to reversibly decrease a distance of separation between the first acoustic deflection pad and the second acoustic deflection pad in response to a stimulus.

17. The method as recited in claim 16, wherein the shape memory alloy wire is composed substantially of nitinol.

18. The method as recited in claim 16, wherein at least one of the first acoustic deflection pad and the second acoustic deflection pad comprises an organic polymeric material.

19. The method as recited in claim 18, wherein the organic polymeric material comprises nylon, polyurethane, polystyrene, or any combination thereof.

20. The method as recited in claim 16, wherein deployment of the first acoustic deflection pad and the second acoustic deflection pad is within an interior space of a door of an automotive vehicle.

* * * * *